(12) United States Patent
Colantonio et al.

(10) Patent No.: US 8,475,860 B2
(45) Date of Patent: Jul. 2, 2013

(54) METHOD AND SYSTEM FOR PREPARING A LIQUID EXTRACT FROM A CELL USING CENTRIFUGAL FORCES

(75) Inventors: Jean-Luc Colantonio, Estavayer-le-Lac (CH); Enzo Bonacci, Savigny (CH); Jean-Paul Denisart, La Conversion (CH); Alfred Yoakim, St. Legier la Chiesaz (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 323 days.

(21) Appl. No.: 12/919,118

(22) PCT Filed: Feb. 27, 2009

(86) PCT No.: PCT/EP2009/052327
§ 371 (c)(1),
(2), (4) Date: Aug. 24, 2010

(87) PCT Pub. No.: WO2009/106598
PCT Pub. Date: Sep. 3, 2009

(65) Prior Publication Data
US 2011/0003038 A1 Jan. 6, 2011

(30) Foreign Application Priority Data
Feb. 29, 2008 (EP) .................................... 08102149
Dec. 3, 2008 (EP) .................................... 08170559

(51) Int. Cl.
*A23F 5/00* (2006.01)
(52) U.S. Cl.
USPC .......... 426/433; 426/432; 426/431; 99/302 C; 99/295; 99/292; 99/323.1

(58) Field of Classification Search
USPC .................... 426/431–434, 77–84; 99/302 C, 99/295, 287, 292, 323.1, 302 R
See application file for complete search history.

(56) References Cited

U.S. PATENT DOCUMENTS 2,333,190 A * 11/1943 McKinnis ...................... 210/211
4,465,697 A * 8/1984 Brice et al. ...................... 426/79

(Continued)

FOREIGN PATENT DOCUMENTS

| EP | 0 367 600 B1 | 5/1990 |
| EP | 0 749 713 B1 | 12/1996 |

(Continued)

OTHER PUBLICATIONS

International Search Report and Written Opinion, PCT/EP2009/052327, mailed Jul. 15, 2009.

*Primary Examiner* — Drew Becker
*Assistant Examiner* — Luana Z Long
(74) *Attorney, Agent, or Firm* — Winston & Strawn LLP

(57) ABSTRACT

A method for preparing a liquid comestible from a cell by passing liquid through the substance using centrifugal forces, wherein gas contained in the cell is controllably purged from the cell as liquid fills the cell. In one embodiment, the method includes prewetting the substance in the cell by filling liquid in the cell and rotating the cell at a first rotational speed; and then extracting the liquid comestible from the cell in an extraction phase which comprises continuing to fill liquid into the cell and rotating the cell at a second rotational speed that is higher than the first rotational speed. The invention also discloses a cell for use in these methods which cell includes a filter for preventing solids from being carried by gas during the gas purge.

20 Claims, 8 Drawing Sheets

U.S. PATENT DOCUMENTS

| | | | |
|---|---|---|---|
| 4,644,855 A * | 2/1987 | Woolman et al. | 99/280 |
| 4,699,794 A * | 10/1987 | Brice et al. | 426/79 |
| 4,806,369 A * | 2/1989 | Thompson | 426/82 |
| 4,962,693 A | 10/1990 | Miwa et al. | 99/283 |
| 5,047,252 A * | 9/1991 | Liu et al. | 426/79 |
| 6,606,938 B2 * | 8/2003 | Taylor | 99/295 |
| 7,469,627 B2 * | 12/2008 | Li | 99/286 |

FOREIGN PATENT DOCUMENTS

| | | |
|---|---|---|
| FR | 2 685 186 | 6/1993 |
| GB | 1 506 074 | 4/1978 |
| WO | WO 2006/112691 A1 | 10/2006 |

* cited by examiner

METHOD AND SYSTEM FOR PREPARING A LIQUID EXTRACT FROM A CELL USING CENTRIFUGAL FORCES

This application is a 371 filing of International Patent Application PCT/EP2009/052327 filed Feb. 27, 2009.

BACKGROUND

The present invention relates to a method and a system for preparing a liquid extract by passing water through a substance contained in a cell which is submitted to a centrifugation. More specifically, the invention is for preparing a beverage extract such as coffee and the like.

It is know to prepare beverages wherein a mixture consisting of brewed coffee and coffee powder is separated with centrifugal forces. Such a mixture is obtained by bringing liquid, such as hot water, and coffee powder together for a defined time. The liquid is then forced through a screen, on which screen powder material is present.

In certain methods such as in GB1506074, the cell comprises a large opening for enabling the coffee to be charged in the capsule. Then, liquid is filled in the cell and the cell is rotated. Normally, the cell is not entirely filled with liquid otherwise liquid would leak from the large opening due to the gradient of pressure which is created at the small discharge orifices.

EP079713 relates to a similar centrifugal apparatus with a cover that adjoins the filter element thus making a substantially closed filter cell. A problem is that if air cannot escape sufficiently rapidly through the filter and the restriction gap at the beginning of the brewing operation, air pockets can form in the cell. The air pocket can be prejudicial to the complete wetting and/or extraction of the substance and may create a rise of the pressure of liquid in the cell which volume is insufficient.

WO 2006/112691 relates to another centrifugal device comprising slits for feeding powder/water mixture and passes into the space delimited between a cylinder and a piston.

One problem of the centrifugal systems is that if too much gas remains in the cell, a limited volume of liquid can enter the cell. Therefore, there can be areas in the cell where the ingredients are not properly wetted. The quality of extraction is consequently affected negatively. In particular, if the powdered ingredients are not properly wetted, the discharged liquid experiences a poor extraction rate, i.e., a low total solid content ("Tc").

Also, if an insufficient amount of liquid is introduced in the capsule, the centrifugal pressure for the liquid to leave the cell will become too elevated thereby requiring a too high rotational speed to make the liquid extract leaves the capsule.

Furthermore, the discharge openings made in the cell can be so small or, the discharge be even closed by a discharge valve, that the volume of gas cannot escape from these openings or valve correctly or timely. Accordingly, improvements in such devices are needed, and these are now provided by the present invention.

SUMMARY OF THE INVENTION

Therefore, one object of the present invention is to equilibrate the gas flow exiting and the liquid flow entering the centrifugal system so that the problems of wetting the ingredients in the cell and priming of the cell with liquid without reaching excessive rotational speeds can be resolved.

Another object of the present invention is to achieve an optimized beverage preparation cycle by ensuring a proper wetting of the ingredients in the cell and a start of the extraction cycle when wetting has been properly completed in order to obtain good extraction properties of the discharged liquid.

Another object is to provide a solution which is clean and does not create leakage of solids and/or liquids which could soil and/or damage the device (e.g., like entering in the ball-bearing of the rotational drive means).

For this, the present invention relates to a method for preparing a liquid comestible from a cell by passing liquid through the substance using centrifugal forces, wherein gas contained in the cell is controllably purged from the cell as liquid fills the cell.

One of the central principle of the invention is thus to provide a dedicated gas purge at a time liquid fills the capsule. Therefore, the cell can be correctly filled with liquid to ensure proper wetting before extraction of the liquid.

Preferably, the release of gas is controlled through at least one dedicated conduit.

The control of the gas release may be further achieved by different means.

In a mode, the selective control of the gas purge is further carried out by a valve. The valve can be a valve designed for selectively enabling gas to escape and which stops liquid coming from the cell.

In the same mode or an alternative one, the selective control of the gas purge is further carried out by increasing the rotational speed of the cell. As a result of the increase of the rotational speed, the centrifugal forces become higher in the cell which thus causes the liquid extraction to begin.

In a possible mode, the purge conduit(s) may be communicating to the atmosphere without actively controllable valve, i.e., a valve requiring the reception of a signal for opening and/or closing.

Preferably, the gas purging conduit is closed by the valve and/or the rotational speed is increased after a determined volume of liquid is filled in the cell or after a predetermined period of time has elapsed.

For this, a controllable valve can be provided to control the gas purge opening. Therefore, gas can be purged when the cell containing dry powder starts to be filled with liquid and until a sufficient quantity of liquid has been filled in the cell. Also the risk of liquid leakage can be reduced since the gas purge can be timely stopped for avoiding liquid or solids to leak from the gas purge when sufficient liquid has been filled in the cell.

In a particular mode, the determined volume of liquid that fills the cell can be measured by a flow meter placed in the liquid supply circuit to the cell. Once the capacity of the cell is reached, i.e., the cell is substantially filled with liquid, the valve closes the gas purging conduit and/or the rotational speed is increased to reach the extraction speed(s).

In possible mode, the gas purge conduit is closed when a predetermined level of liquid is detected on the top or outside of the cell.

For instance, the level of liquid can be detected by a liquid sensor in the gas purging conduit. Such liquid sensor can detect a change in the electrical property of the fluid, e.g., conductivity, capacitance or resistance, in the conduit or in the flow path between the cell and the conduit or in a top part of the cell itself. The electrical property data is received by a control unit which activates the valve in response for closing the gas purging conduit and/or increasing the rotational speed of the means driving the cell in rotation.

In another possible mode, the at least one gas purge conduit can regulate itself by a valve opening and closing without intervention of the control unit. In one example, the valve is controlled in closure by the effect of centrifugal forces. For this, the valve can take a first position of opening of the gas purge conduit when the centrifugal forces applied on it are below a certain threshold value and a second position of closure of the conduit when the centrifugal forces exceeds the threshold value. In this case, the valve in the conduit is positioned in an offset position relative to the central axis to receive the centrifugal forces and the closure of the valve is carried out automatically when the cell is driven in centrifugation at sufficient rotational speed. The valve can for instance be a rubber elastic member being deformed or displaced in a sealing seat of the conduit by the effect of centrifugation.

More preferably, gas is removed by creating a gas purge substantially at the central axis of rotation of the cell. A central location of the gas purge is preferred since the centrifugal forces which exert on the liquid and which could create leakage, are minimum in that area. By central location, it is meant an axial location which is not distant from the central axis of more than 1/5 of the maximal radius of the cell.

In one possible mode, a gas purging conduit is introduced in the cell, preferably, through a lid membrane of the cell. Therefore, as liquid fills in the cell, the gas is sucked in the gas purging inlet of the conduit before it leaves the cell.

In another mode, the gas purging conduit is placed outside of the cell. Preferably, the cell has a lid membrane which is perforated thereby allowing gas to escape from the cell and to be vented through a conduit placed above the lid membrane. Perforations of the lid membrane can be carried out for providing liquid outlets in the cell therefore enabling gas to leave the cell in its way to the purge conduit.

According to one possible aspect of the invention, the centrifuged liquid is prevented from being discharged from the cell until a sufficient centrifugal speed is reached. In particular, the centrifuged liquid flow is stopped by a discharge valve forming a pressure threshold to be overcome for the centrifuged liquid leaving the cell. The discharge valve is placed in the peripheral area of the cell. In comparison, a discharge valve creates a controllable pressure threshold and does not require small orifices to be provided in the cell with the risk to have such orifices be blocked or clogged. However, a valve at the discharge side of the cell also blocks gas in the cell which cannot escape through the closed valve. Therefore, a discharge valve requires providing the gas purge conduit(s) of the present invention be placed upstream of the valve. The discharge valve is preferably designed for providing a restriction of the flow of the discharged liquid which may increase as a function of the increase of the rotational speed. For instance, the discharge valve is a ring-shaped restriction means forced in closure by a spring-biasing means.

According to another aspect of the invention, gas is preferably purged during a prewetting phase during which liquid is injected.

In a possible mode, a fluid selective sealing means is provided at the interface of the liquid injecting means and a bore of a rotary engaging base engaging on the cell, for allowing gas to escape from the receptacle when the receptacle is filled with water but for stopping water from leaking out of the interface.

For this, the conduit may form an interstice designed and/or dimensioned to provide a selective fluid escape.

In particular, volatile compounds such as the gas can travel through the interstice whereas liquids such as water or a mixture of water and substance, which are more viscous cannot travel trough the interstice.

The interstice may extend along a length at the interface sufficient to prevent liquid from completely traversing the interstice. In particular, the interstice may have a length of at least 10 mm, more preferably, of more than 10 mm. The thickness of the interstice can range from about 0.1 to 1.0 mm.

In a preferred mode, the interstice is obtained by an helicoidal threading of the rotary engaging base. The threading creates a long helicoidal fluid path which, due its rotational movement relative to the water injector, tends to push the liquid back in the direction of the receptacle.

More preferably, a water transport means is provided in the fluid circuit upstream of the water injector to provide water through the water injector at a relatively low pressure. The water transport means can be a pressure pump such as a centrifuge pump, a diaphragm pump a gravity pump or a peristaltic pump, a piston pump for example. The pump can be designed to fill water in the receptacle at relatively no positive pressure above atmospheric pressure. A pressure transport means for water also contributes to ensure that liquid is not given sufficient momentum to traverse the dynamic sealing means. In fact, the dynamic seal provide a greater momentum to the liquid to counter the momentum that could be given to the liquid by the water transport means pushed inside the interstice.

In addition, a contact seal means may be placed between the rotary engaging base and the entry wall of the receptacle. Preferably, the contact seal provides an axial sealing on the surface of the receptacle. The contact seal means ensures that no liquid can circulate between the receptacle and the rotary base due to the centrifuging forces that could bypass the centrifuged flow path in the receptacle and so could dilute the beverage.

Preferably, the contact seal means is a rubber elastic member such as a rubber or silicone O-ring forming an axial sealing arrangement.

In a preferred mode, the contact seal means is placed immediately about the water injector. As a result, liquid is prevented from escaping the receptacle by the pierced outlet and from contacting the outer surface of the receptacle. When the device is opened and the receptacle removed from the device, there is less residual liquid such as hot water in the device that could drip in an uncontrolled manner.

According to a specific aspect of the invention, the rotary engaging base comprises at least one piercing member which is placed at the periphery of the base for piercing at least one outlet in the wall of the receptacle. More preferably, the rotary engaging base comprises several piercing members evenly distributed at the periphery of the engaging base.

The rotary base can take the form of a disc that applies a engaging pressure on the wall of the receptacle during closing of the device about the receptacle. Due to the engaging pressure applied, the piercing members can pierce outlets in the receptacle for allowing beverage from leaving the receptacle.

In another aspect, the rotary base comprises an elastically biased valve which opens at a certain threshold of pressure of the centrifuged liquid exiting of the receptacle.

According to another aspect of the invention, the method is for preparing a liquid comestible from a cell by passing liquid through the substance using centrifugal forces, wherein it comprises a prewetting phase during which liquid is filled in the cell and the cell is rotated at a first rotational speed and an extraction phase during which liquid continues to be filed in the capsule and the cell is rotated at a second rotational speed higher than the first rotational speed.

Preferably, the second rotational speed is increased as a result of the level of filling of liquid in the cell. In particular, the second rotational speed is increased when the level of liquid is detected to a predetermined filling level. The filling level may be detected directly by a liquid sensor or indirectly by measuring the volume of liquid supplied to the cell.

"Prewetting" refers to a phase during which liquid is intimately mixed with the ingredients in the cell before centrifugation is sufficient to make the liquid extract leave the cell at the discharge side, e.g., by opening the discharge valve.

"Extraction" refers to the phase at which liquid passes through the ingredients and is discharged from the cell as a result of the centrifugal forces. In the context of the modes of the invention, a discharge of the liquid may require that a sufficient rotational speed of the cell be attained.

During prewetting, the cell may be driven in rotation at a lower speed than during extraction. During prewetting, the cell may remain static or be rotated in an intermittent manner.

It has been noticed that a prewetting of the substance, in particular, ground coffee, provides an improved extraction and consequently an improved taste and aroma. During this phase, the rotational speed is preferably maintained sufficiently low so that the liquid extract remains in the cell and mixes thoroughly with the substance. As liquid is filled in the cell and the cell rotates slowly, gas can be purged so that at least a significant amount of gas contained in the cell is removed to leave enough space for the liquid to occupy the cell and mix with the substance.

In a particular embodiment, gas is purged through at least one conduit other than a first liquid conduit supplying liquid in the cell. In a particular mode, the gas purging conduit is arranged concentrically about the said first liquid injecting conduit. The liquid supplying conduit can be a hollow needle that perforates a lid membrane of the cell. The liquid supplying conduit can be aligned along the axis of rotation.

In a possible mode, after purging gas out of the cell, liquid can also be injected through the gas conduit in the cell. Therefore, liquid can be injected both through the liquid conduit and through the gas conduit after gas purging is carried out. This presents the advantage that the gas conduit can be rinsed from the possible solid particles which could have entered the gas conduit during the gas purging operation.

The method of the invention may further include a spin-drying phase of the substance contained in the cell after the extraction phase. During the spin-drying phase, the gas conduit can be used to provide pressure equilibrium in the cell by introducing air in the cell for replacing liquid being discharged from the discharge side of the cell. In particular, the gas conduit can be placed at the atmospheric pressure by a controllable valve. This pressure equilibrium ensures that the cell does not deform under a relative vacuum.

The present invention also relates to a beverage production system for preparing a liquid extract from a food substance contained in a cell by passing a liquid through the food substance by centrifugation of the cell comprising:

a liquid injection means for filling liquid in the cell,
rotational driving means for driving the cell in rotation at, at least one, centrifugal speed,
a peripheral discharge means for enabling liquid extract to leave the cell at the said centrifugal speed,
wherein it comprises a dedicated gas purging means configured to remove gas from the cell as liquid fills the cell.

The gas purging means can comprise a dedicated gas purging conduit which is separate from a main liquid supply conduit, e.g., for connecting the internal volume of the cell to the atmosphere, while liquid is supplied in the cell.

The system preferably comprises speed control means for increasing the rotational speed of the driving means to vary the beverage preparation cycle from a prewetting phase to an extraction phase.

The system preferably comprises means for detecting the filling level of liquid in the cell. Indeed, these fill level detecting means enable to coordinate the beginning of the extraction phase following the wetting phase and consequently ensure the achievement of proper extraction properties of the discharged liquid, e.g., a coffee beverage with proper Tc.

A valve may further be associated to at least one gas purging conduit for selectively allowing gas being purged in a controllable manner.

In a mode, the gas purging means comprises at least one gas purging conduit which is connected to a controllable valve for controlling the time the gas purging conduit is maintained open as liquid fills the capsule through a separate liquid supply conduit.

In another mode, the gas purging conduit communicates to the atmosphere without valve.

In a particular embodiment, the gas purging conduit has a gas inlet entering in the cell.

In another embodiment, the gas purging conduit has a gas inlet which is external to the cell and is preferably placed above the cell, in particular, above a lid of the cell.

More particularly, the gas purging conduit is controlled to open in a prewetting phase at which liquid is injected in the cell and the cell is rotated at a lower speed than the centrifugal speed at which the liquid extract leaves the cell by centrifugal forces via the discharge means. Therefore, the gas conduit can be maintained opened during the prewetting phase by the valve. The valve can then be controlled to be closed after a predetermined volume of liquid is filled into cell or after a certain period of time. For instance, the system can comprise a flow meter to provide an input as to the volume of liquid which is supplied in the cell. The flow meter can provide a signal to the control unit, e.g., under the form of impulses which are counted by a control unit of the device. When a predetermined amount of impulses has been reached, the valve of the gas conduit closes the conduit for the gas contained in the cell.

In a possible mode of control, the system comprises a liquid detection device for detecting a maximum level of liquid in or outside the cell. A liquid detection device can comprise, e.g. electrical resistive, inductive or capacitive, sensors. The sensors can be placed, for instance in the gas purging conduit or between the conduit and the cell, e.g. above the lid of the cell. A control unit ensures the increase of the rotational speed and/or activation of the valve as a response to a change of the sensed values corresponding to the detection of either gas or liquid at the sensors location. For instance, as speed is increased above a preset value corresponding to sufficient centrifugal forces being exerted in the cell, the extraction of the liquid begins through the discharge means. As a result, the discharge valve means opens causing liquid to be discharged or extracted from the cell. Since the level of liquid has been previously sensed to the desired level, the extraction can take place while being assured that the ingredients in the cell are properly wetted.

The liquid supplying conduit can be associated to a sealing member which applies a sealing at the interface between the conduit and the lid of the cell, e.g., a top membrane of the capsule. As a result, liquid is prevented from leaking at the base of the liquid supplying conduit but is forced to traverse the substance in the cell for a better wetting of the ingredients, e.g. coffee particles.

In a possible mode, the valve is controllable/controlled to place the gas conduit in communication with a liquid supply so as to supply liquid in the cell via the gas purging conduit after gas is purged from the cell. Therefore, closing of the gas conduit is made by switching the valve in a position where the gas purging conduit is put in communication with the liquid supply. The gas purging conduit can thus provide liquid in the cell in addition to the main liquid conduit. As a result, the liquid flow rate can be significantly increased in the cell during the centrifugal phase where the rotational speed of the cell is higher than during the prewetting phase. The gas conduit can thus be rinsed from solid particles which may be introduced in the conduit during the first phase.

The valve may further be configured to place the gas conduit at the atmosphere during a spin-drying phase following the extraction phase. During the spin-drying phase, the liquid supply means is stopped and the rotational drive means are maintained at a high speed to enable the liquid to leave the capsule through the peripheral discharge side of the cell.

In a particular mode, the gas conduit can be placed concentrically around a liquid supply conduit for supplying liquid in the cell.

In a preferred mode, the peripheral discharge means comprise a restriction valve for controlling the flow of the discharged liquid. The restriction valve preferably acts to open when a determined centrifugal pressure of the discharged liquid is attained against the valve during the increase of the rotational speed during the extraction phase. The restriction valve has preferably a ring-shaped closing means and a spring biasing means for opposing a resistance to pressurized flow of liquid exiting the cell.

In another aspect of the invention, the invention also relates to a cell comprising a filter for preventing solids from being carried by gas during purge. The filter can be placed to separate at least two volumes in the cells; one of which containing the food ingredients. Indeed, a major problem may be created by the solid particles which block the flow of gas being removed from the cell. The filter preferably comprises openings of diameter and/or slots of width of less than 250 microns. The filter can be an integral part of the cell such as a porous plastic portion or a mesh, a woven or non-woven or a filter paper.

Furthermore, the cell can be a sealingly closed capsule before it is introduced in the system. The capsule can contain a food substance protected by an inert gas such as $CO_2$ and/or nitrogen.

Therefore, the invention also relates to a capsule for providing a cleaner solution than "open" systems and a more controllable quality of the delivered liquid extract.

The capsule can be closed by a closing membrane which is pierced by piercing elements of the system for providing a liquid inlet and outlets.

The capsule can comprise an internal filter portion for preventing solids from exiting the capsule through the liquid inlet, e.g., a pierced inlet of the capsule. This first filter portion is preferably in a central location of the capsule.

The capsule can also comprise a second filter portion for preventing solids from exiting through the liquid outlets, e.g., through pierced outlets of the capsule. This second filter portion is preferably in a peripheral region of the capsule. The filter portions can be part of a same internal lid inserted in a cup-shaped body of the capsule. The first and second filter portions can also be part of separate elements of the capsule.

The capsule can contain beverage ingredients comprising: ground coffee, leaf tea, instant coffee, instant tea, herbal tea, cocoa, milk, creamer, nutritional ingredients and combinations thereof.

In order to avoid unnecessary repetitions in the present application, all the characteristics mentioned in relation to the present method can be applicable as well to the system and vice versa.

BRIEF DESCRIPTION OF THE DRAWINGS

The invention will be explained in more detail below in reference to the drawings attached.

DETAILED DESCRIPTION OF THE INVENTION

Figure 1:
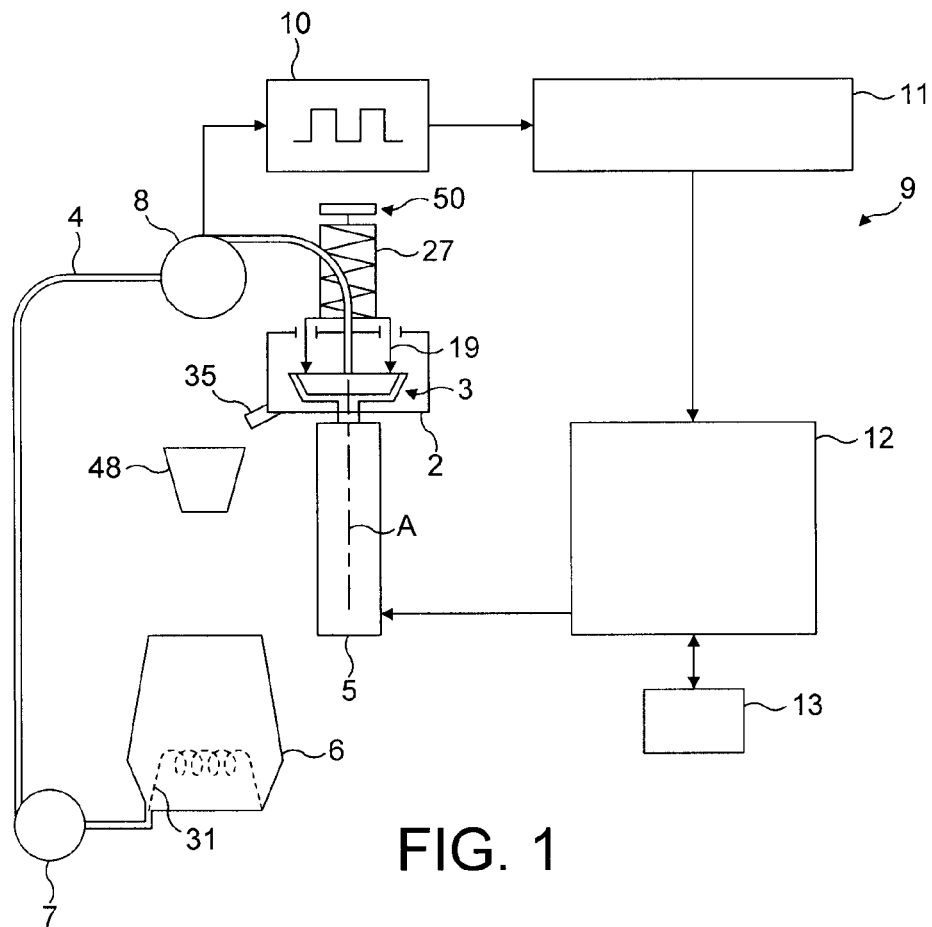
FIG. 1 is a schematic general representation of the system of the present invention.

As can be seen in FIG. 1, the centrifugal system of the present invention comprises a centrifugal unit 2 in which a centrifugal cell 3 is placed. The centrifugal cell 3 may be a single-use capsule which contains portioned food ingredients such as a roast and ground coffee portion. Before its insertion in the unit, the capsule is preferably sealed in a gastight manner to maintain freshness of the food ingredients contained therein. Alternatively, the centrifugal cell 3 may be a re-fillable cell of the centrifugal unit 2.

The centrifugal unit 2 is connected to driving means 5 which comprise an electric rotary motor and a driving shaft. The driving means 5 are designed to rotate a rotary drum of the centrifugal unit along an axis of rotation A and thus, the centrifugal cell 3 housed within the rotary drum of the centrifugal unit 2 about the same axis A of the centrifugal cell. It should be noted that the cell could be part of or all of the rotary drum, in particular, when the cell is not specifically a single-use capsule but a refillable part of the device.

The centrifugal unit 2 further comprises a collecting part and a discharge duct 35 through which the beverage to be prepared is discharged into a receptacle 48 such as a cup or mug, for example, placed below the discharge duct.

The system further comprises liquid supply means which includes a water reservoir 6 and a fluid circuit 4. The reservoir 6 preferably comprises water heating means 31 for heating the water contained in the reservoir 6. The heating means 31 may be a heating coil. The heating means of the water may as well be obtained by a thermobloc in the fluid circuit 4 and placed downstream relatively to the water reservoir 6.

The liquid supply means further comprise a pump 7 connected to the reservoir 6. The pump 7 is preferably a centrifugal pump. Moreover, the pump 7 is connected to the centrifugal unit 2 by means of the fluid circuit 4.

The pump 7 is preferably a low pressure pump which serves the purpose of providing sufficient liquid to the cell 3. In addition, during the operations, the centrifugal cell acts as a centrifugal pump by drawings water from the liquid supply.

In the centrifugal unit, a liquid discharge valve 19 is provided to create a flow restriction of the centrifuged liquid which leaves the cell 3 before it is collected in the collecting part of the unit. The discharge valve 19 enables to increase the dwell time of liquid in the cell and therefore improves the extraction, in particular, for coffee. Furthermore, due to the high rotational forces necessary for the flow to pass through the discharge valve, the flow is significantly accelerated. As a result, a nice amount of foam or crema can be obtained.

Preferably, the discharge valve opens for leaving an annular flow gap and enabling the centrifuged liquid to leave the cell when a certain threshold of pressure has been attained at the valve by the liquid. For this, the valve 19 comprises elastic biasing means 27 for counter-acting the pressure of the centrifuged liquid up to a given load. Furthermore, the valve's load can be made adjustable to open at a certain threshold of pressure by means of a load actuating means 50. For instance, the load actuating means 50 acts on the elastic biasing means 27 to vary the pre-load on the valve 19. Therefore, the higher the elastic means are pre-stressed, e.g., by a compressive constraint of the actuating means 50 on the resilient member, the higher the pressure of liquid is necessary for overcoming the valve for maintaining a consistent flow rate, therefore, the higher the rotational speed must be. As a result, the level of foam or coffee crema can be controlled by adjusting the load of the valve means 19.

In the fluid circuit 4 between the liquid supply means and the centrifugal unit 2, metering means 8 for the flow rate of the liquid are provided. The metering means 8 are for example a pulse-coded flow metering turbine which generates electrical impulse data 10. Therefore, the period of the generated impulses is preferably proportional to the velocity of the liquid flow within the fluid circuit 4.

The system further comprises control means 9 which comprises a counter 11, a central controller 12 such as a PID controller able to provide control loop feedback mechanism and a manual interface 13. The control means are connected to the flow-metering turbine 8 to receive the process variable relative to the flow rate and to the driving means 5 of the rotational motor for input of the manipulated variable to the motor, i.e., the rotational speed. Furthermore, the controller 12 is connected to the pump 7 to start and stop the liquid supply in the circuit.

The counter 11 connected to the flow-metering turbine 8 enables an analysis of the generated impulse data 10. The analysed data is then transferred to the central controller 12. Accordingly, the exact actual flow rate of the liquid within the fluid circuit 4 can be calculated in real-time.

Figure 2:
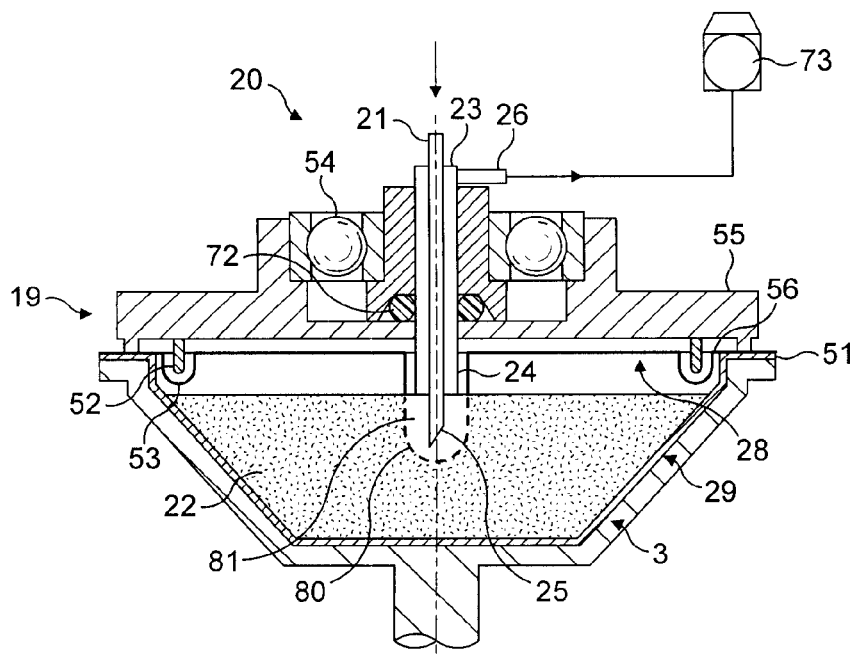
FIG. 2 is a schematic representation of a part of the system of the invention.

Turning to FIG. 2, the system of the present invention further comprises a fluid injection means 20 for primarily injecting liquid in the cell 3. The fluid injection means is mounted fixedly on the unit 2 but connected via ball bearings 54 to a rotary plate 55 comprising a discharge ring-shaped valve 19.

The fluid injection means comprise a first liquid supply conduit 21 which is substantially aligned along the axis of rotation "A". The conduit 21 can take the form of a needle or lance which is insertable in the cell, e.g., a sealed capsule, to provide liquid in the volume 22 containing the beverage substance. A second conduit 23 can be provided which surrounds the first liquid supply conduit 21. The second conduit 23 as will be later explained can have different functions, one of which is to enable gas to be removed or purged from the cell. As illustrated in the preferred embodiment, the second conduit 23 is concentrically placed with respect to the first conduit 21. However other arrangements can be thought of, for example, a second conduit 23 which is placed adjacent (i.e., side-to-side or close) the first conduit 21.

The second conduit 23 for purging gas out of the capsule has a first free end 24 in the cell which is above the free injection outlet 25 of the first conduit 21 which enters deeper in the cell, as gas tends to accumulate in the upper central region of the cell. This preferred design also reduces the risk of liquid to be sucked in the second conduit.

Preferably, a sealing member such as a rubber gasket 72 is placed around the outermost conduit 23 to ensure that liquid coming out of the capsule does not enter the ball bearings 54.

In a first embodiment, the second conduit 23 is connected directly to atmosphere or indirectly via a selective valve 73 by a second free end 26. As a result, gas can be directly vented by the conduit 23 and release to atmosphere. The valve 73 can be a check valve which allows selective passage for gas but closes to liquids. The conduit 23 forms a control leakage of gas which can be calibrated as a function of the volume of gas contained in the cell. It should be noted that gas contained in the cell can be air, an inert gas such as carbon dioxide or nitrogen, or a mixture of these gas.

As apparent in FIG. 2 also, the cell 3 can be provided with a lid 28 which fits into a cup-shaped body 29 of the cell. A sealing membrane 56 can be sealed onto the peripheral edge 51 of the body of the capsule onto which the valve 19 can apply a closing force. Thus the sealing membrane covers the lid and makes the capsule impervious to gas and liquids before the membrane is pierced or the membrane eventually removed or otherwise opened. Piercing members 52 can be provided on the centrifugal unit, preferably, peripherally placed relative to the central axis to pierce a series of outlets in the membrane and to allow the flow of beverage to be released out of the cell. The lid 28 can form a small peripheral annular recess 53 to collect the flow and distribute it to the pierced outlets through the membrane.

Of course, the design of the cell can take many different configurations without departing from the scope of the present invention. For instance, the lid for supporting the membrane is not mandatory.

Figure 3:
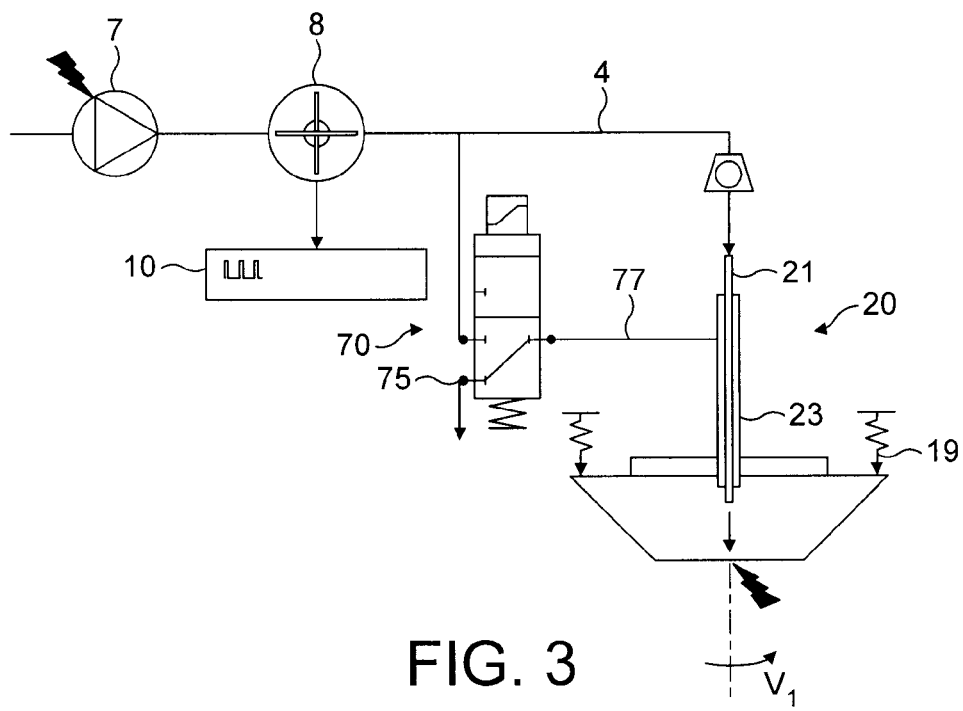
FIG. 3 is schematic representation of a part of the invention according to a second embodiment during the prewetting phase and gas purging.

In reference to FIG. 3, for a different embodiment, a controllable valve 70 is provided to control the different operational modes of the fluid injection means 21 including the gas purging operation and the centrifugal and the spin-drying phases. The valve 70 is preferably a multiple-way valve. The valve 70 can be configured to be moved in the different positions (Venting, liquid supply, . . . ) by way of solenoid means or other suitable means.

In a first mode illustrated at FIG. 3, a prewetting of the substance is carried out in the cell by injecting liquid through the first conduit 21 directly in fluid communication with the fluid circuit 4. The liquid pump means 7 is switched on and the rotational driving means (motor) are driving the cell at a relatively low rotational speed v1. For instance, the rotational speed v1 of the cell is lower than 200 RPM. During this prewetting phase, the valve 70 is configured, e.g. is moved, to connect the gas purging conduit 23, e.g., via intermediate communication line 77, with a vent outlet 75 communicating with the ambient atmosphere. A minor amount of liquid mixed with gas may eventually be released by the outlet 75 and drained to a reservoir (not shown). During this phase, the volume of cell which is not occupied by the substance is preferably entirely filled with liquid. The liquid can start wetting and mixing with the substance, e.g., coffee particles. The rotational speed is insufficient for the liquid to traverse the substance or, at least, for a sufficient pressure of liquid to open the discharge valve 19.

Figure 4:
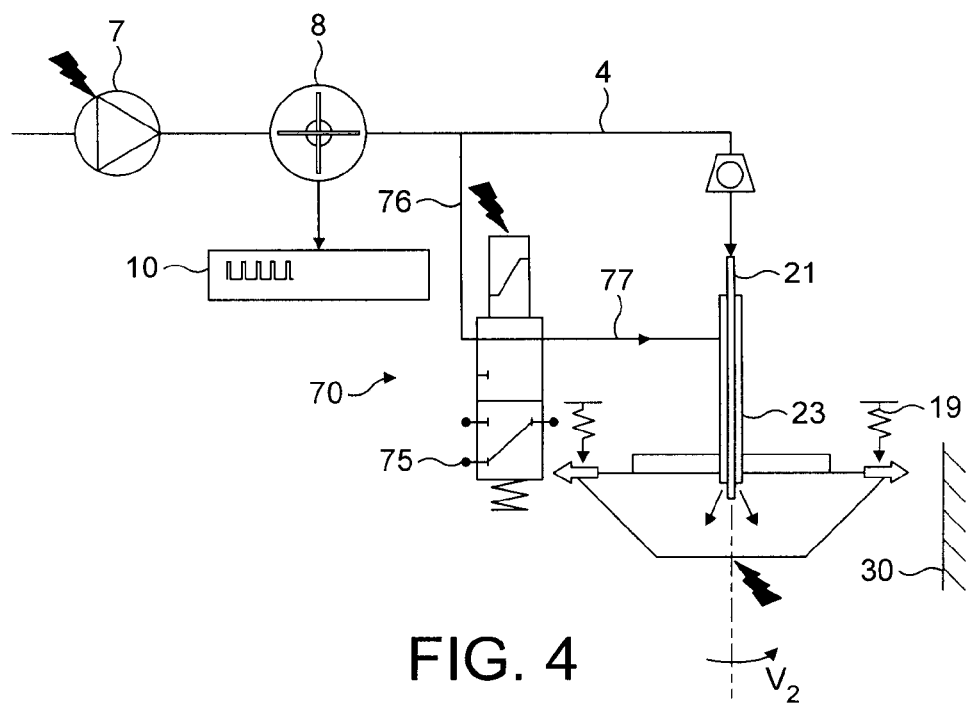
FIG. 4 is a schematic representation of a part of the invention during the subsequent extraction phase.

After the prewetting is completed, the centrifugal extraction is carried out by driving the cell at a higher rotational speed v2 illustrated in FIG. 4. The speed increase is thus controlled by the control unit after a predetermined time or a predetermined volume of liquid is supplied to the cell as measured by the flow meter 8.

The gas purging conduit 23 is then closed to the vent by control of the valve 70, e.g., by a relative movement of the valve, and connected to a liquid supply line 76 via the fixed intermediate communication line 77. In this configuration, liquid is supplied by the two conduits 21 and 23 of the fluid injection means 20. As a result of the higher speed, e.g., of about from 4000 to 15000 RPM, the liquid entering the cell is forced to pass through the substance which is centrifuged against the sidewall of the cell. A liquid extract is formed which passes through the outlets of the cell and forces under pressure the discharge valve 19 to open. The liquid extract is projected against an impact wall 30 of the unit, then collected and dispensed. It should be noted that the connection of the gas purging conduit 23 to the liquid line 76 by the valve can be omitted and the conduit 23 could also be just closed. In case, the connection of the conduit 23 with the liquid supply line 76 is carried out by the valve, this may happen after a predetermined volume of liquid has been measured by the flow meter. More precisely, the controller receives impulse data 10 from the flow meter 8 as to the amount of liquid and the controller activates the valve accordingly. The activation of the valve may happen after the extraction phase at the higher speed has started since a residual amount of gas may still need to be evacuated when the prewetting phase is finished. In particular, the residual gas of lower density than liquid will predominantly remain in the centre of the cell whereas liquid will move to the periphery, as resulting from the centrifugal forces, forming a gas cylinder in the centre which can be evacuated by the gas purging conduit. When the liquid is supplied through the gas purging conduit 23 of the fluid injecting means, the conduit is rinsed from solid particles which may have entered the conduit. Therefore, the risk of the conduit being clogged is largely reduced.

Of course, the activation of the valve 70 can also be related to time only and not necessarily to a volume of liquid as measured by the flow meter. In this case, the controller can activate the valve after a predetermined time has elapsed, e.g., from the start of the pump 7.

Figure 5:
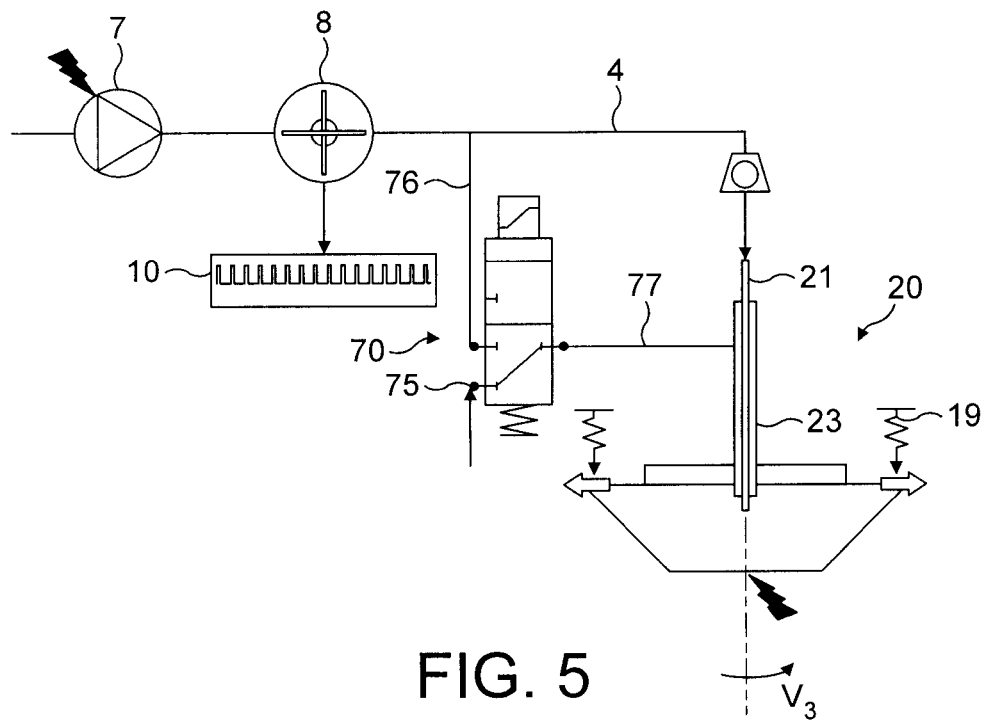
FIG. 5 is a schematic representation of a part of the invention during the final spin-drying phase.

In a last phase, as illustrated in FIG. 5, the rotational driving means are activated by the controller at a speed v3 for carrying out a spin-drying of the substance in the cell. The spin-drying phase may be set higher than the centrifugal extraction speed v2, e.g., 10 to 50% higher. The controller also stops the liquid supply pump 7 so that no more liquid enters the cell. The valve 70 is also activated to interrupt communication between the liquid line 76 and liquid supply conduit 21. The de-activation of the pump preferably takes place after the predetermined liquid volume corresponding to the cup volume has been measured by the flow meter 8. For instance, the preparation of an espresso coffee requires about 40 mL of liquid to be supplied in the cell. Different beverage volumes can be stored as set points in the controller, for instance, 25, 40, 110 and 220 mL, enabling the preparation of various coffee beverages (e.g., ristretto, espresso, lungo, Americano, . . . ).

During this phase, the gas purging conduit is re-connected to the vent outlet 75 by the valve 70 so that air can be drawn in the cell by the differential of pressure which is exerted in the cell due to the high rotational forces. As liquid is progressively removed from the cell and no more liquid enters the cell, the pressure in the cell decreases and ambient air is sucked in the cell by effect of vacuum. The pressure in the cell will so equilibrate until the rotation is stopped. The controller stops the rotation of the cell after a predetermined time.

It should also be noted that the beverage preparation system may comprise a filter of particles placed in the cell and/or in the fluid injection means. In FIG. 2, the cell has been illustrated as a single-use capsule which comprises a filter 80 which is placed between the volume 22 containing the substance and the upper surface or membrane 56. The filter is preferably a porous portion having openings smaller than the mean diameter of particles of the food ingredients. The portion may be rigid or elastic. It can be made of a porous plastic with small holes or slits, a meshed material, a woven, non woven or a paper filter. The portion is placed to separate a free insertion volume 81 for insertion of a portion of the fluid injection conduits 21, 23 from the volume 22 containing the food particles. Thereby, the filter acts to prevent the solid particles from contaminating the free insertion volume 81 and, consequently, from entering the conduits 21, 22. It should be noted that the filter can be placed at the entrance 24, 25 of the gas purging conduit 23 and/or of the main liquid supply conduit 21. For instance, the filter may be a piece of sintered porous material. In other variants, the gas purging conduit 21 could terminate in the cell as a nozzle with many thin outlet slots forming a water distribution means as well as a filtering means for particles.

Figure 6:
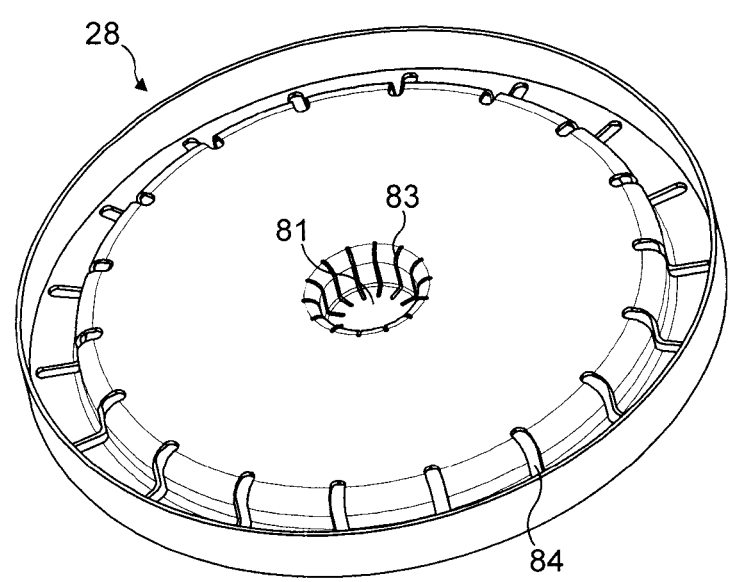
FIG. 6 shows a view of an internal lid of an embodiment of the cell of the invention.

FIG. 6 illustrates an example of lid 28 of the capsule of FIG. 2. The lid comprises a central recess 81 provided with a series of slots 83 which act to retain solid particles in the ingredients compartment (volume 22) of the capsule. The slots 83 acts in filtering the gas that is purged from the capsule. At the periphery of the lid 28 is an annular recess 53 comprising a second series of slots 84 for filtering the liquid which is centrifuged out of the capsule. Hence, the liquid is collected in the recess 53 and leaves the capsule via the pierced outlets and then is ejected through the discharge valve.

Figure 7:
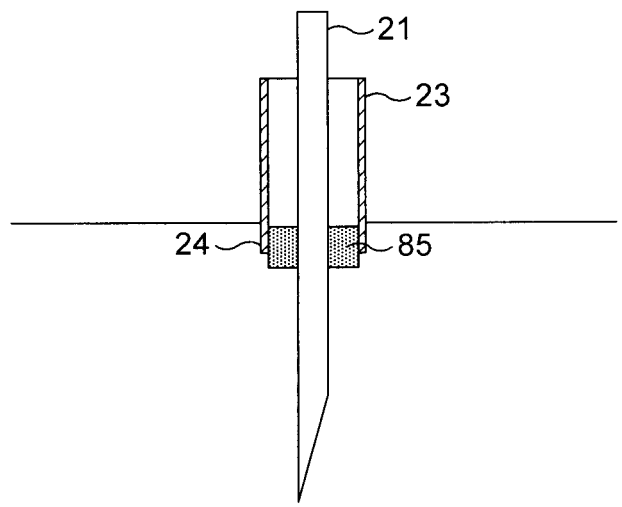
FIG. 7 shows a detail of a fluid injecting means of the system according to another variant.

FIG. 7 illustrates a variant in which the particle filter 85 is directly associated to the gas purging conduit 23. For instance, it is here inserted as a grid, a mesh or sintered block at the free end or inlet 24 of the gas purging conduit.

Figure 8:
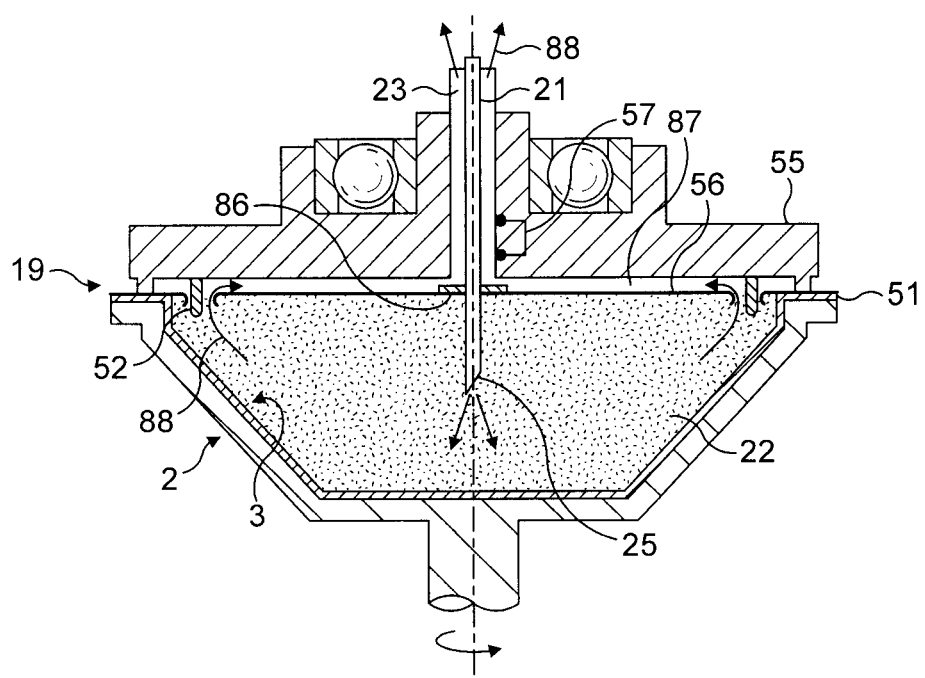
FIG. 8 shows a cross sectional view of a system of the present invention according to another variant during gas purging.

FIG. 8 illustrates another variant of the system of the present invention. The system comprises a cell 3 such as a single-use capsule comprising a dose of food substance to be extracted, e.g., ground coffee, which is received in a centrifugal unit 2. On the rotary plate 55 which engages against the cell, a liquid discharge valve 19 is provided which applies an elastic pressure onto the peripheral edge 51 of the capsule. The capsule comprises a lid membrane 56 which is pierced by outlet piercing means 52 thereby forming a series of outlets, e.g., perforations, for the fluid to escape the capsule.

In the central part of the plate 55, an injection conduit 21 is provided for injecting hot water in the volume 22 of the capsule through its intruding injection outlet 25. A gas purging conduit 23 is placed concentrically around the liquid supply conduit 21. The gas purging conduit ends above the upper surface, i.e., lid membrane, of the capsule, while leaving preferably a short distance. A liquid sensor 57 is placed at the entrance of the gas purging conduit. The sensor is connected to the control unit 12 (FIG. 1) and therefore can transmit data to the unit for regulating, i.e., increasing, the rotational speed of the centrifugal unit 2 when the capsule is filled with liquid. In case a control valve (optional) is provided at the end of the conduit 23, the sensor may also transmit data for closing the conduit 23 when the capsule is substantially filled with liquid.

As an independent aspect of the invention, a sealing member such as a gasket or a silicone pad 86 is placed at the interface between the liquid supply conduit 21 and the upper surface or lid membrane 56 of the capsule. The pad may be connected to membrane 56 of the capsule. As a result, there is no liquid after injection which can leak by effect of the rotational forces and thus could by-pass the mass of ingredients. It should be noted that the sealing member can be part of the conduit or part of the capsule, for example, glued onto the membrane. In the present embodiment, a filter in the capsule is not necessary but could be provided to reduce the risk of solid particles of the food substance passing through the membrane 56.

The system works as follows. In the prewetting phase, the unit is driven at low rotational speed and liquid starts filling the capsule by conduit 21. Liquid will be forced to flow through the ingredients and gas contained in the capsule is pushed through the pierced outlets in the lid membrane at the locations 52. Since a seal is created by the sealing pad 86, no fluid can exit at the base of the liquid supply conduit 21. On the contrary, gas flow 88 will traverse the membrane and be forced to flow through the gas purging conduit 23 at the passage 87 between the lid membrane 56 of the capsule and the lower surface of the rotary plate 55. Since the rotational speed is low, the discharge valve 19 remains closed during prewetting. Therefore, gas and liquid may only escape towards conduit 23. After gas has been substantially removed from the capsule and as the capsule is filled with liquid, liquid can so pass through the peripheral outlets (perforations) and enter the conduit 23. As liquid enters the conduit, the liquid sensor detects it and controls via the control unit the increase of the rotational speed and/or the closing of the purge valve (not shown). Therefore, in the next phase, i.e., the extraction phase, the capsule is driven in rotation at a higher speed, e.g., 5000-16000 RPM, while water continues to be fed in the capsule by the liquid supply conduit 21. Since the rotational speed is sufficient to create high rotation forces, the centrifuged liquid forces the valve 19 to open. The extracted liquid is thus released to the discharged means, i.e., through the valve 19 in opened position, by forming an annular layer of liquid projecting at high velocity on an impact surface of the system and then being collected and funnelled to a beverage receptacle. Of course, the liquid sensor can be placed further upstream of the gas purging conduit 23, for instance along the passage 87. For example, the sensor can be a sensor measuring an electrical value, e.g., the electrical resistance, between the needle 25 and a fixed point at the inner surface of the rotary plate 55.

Figure 9:
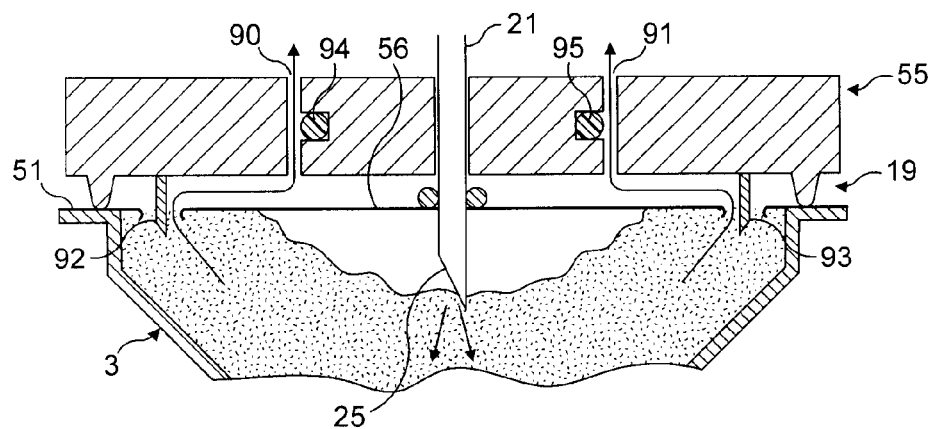
FIG. 9 shows a detailed cross sectional view of the system according to still another variant during the prewetting phase.
Figure 10:
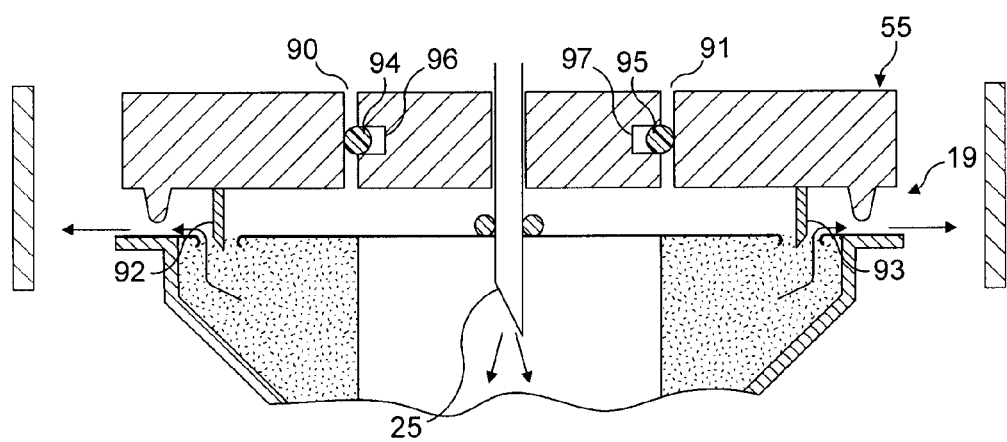
FIG. 10 shows a detailed cross sectional view of the system of FIG. 9 during the extraction phase.
Figure 11:
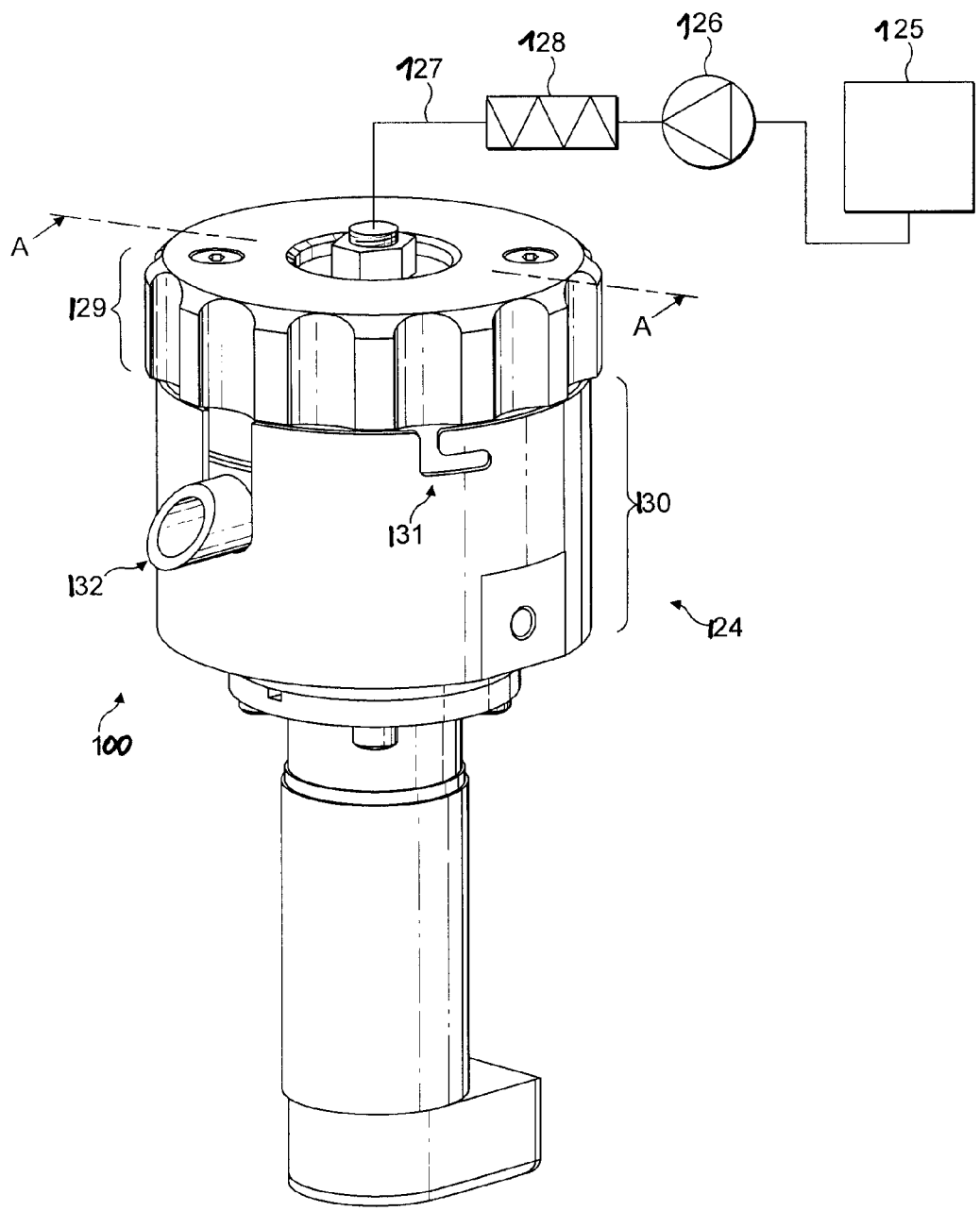
FIG. 11 shows a perspective view of a beverage preparation device according to another embodiment of the invention.

In another embodiment illustrated in FIGS. 9 and 10, the system of the present invention comprises purging means which closes under the effect of the centrifugal forces. Therefore, as the rotational speed increases during the beverage preparation process, the valve closes the conduits. More particularly, a series of gas purging conduits 90, 91 are provided in the rotary plate 55 for allowing gas coming from the cell 3 to be vented after passing the outlet perforations 92, 93 provided in the membrane 56. As the discharge valve 19 remains closed during this phase, gas will exit freely through the conduits 90, 91. The conduits are further associated with sealing elements 94, 95 such as rubber gaskets. The sealing elements can move, e.g. by compressive effect, from a housed position in their seats 96, 97 corresponding to the opening of the conduits, as illustrated in FIG. 9, to a deployed position from the seats 96, 97, e.g., by relaxation of the seal elements, corresponding to the closing of the conduits, illustrated in FIG. 10. The passage from the first position to the second position is obtained when the rotational speed exceeds a certain threshold which exerts a deformation of the sealing elements. The sealing elements thus expand outwardly in the axial direction of the conduits. As soon as the rotational speed decreases or is stopped, the sealing elements return to their rest position in their seats 96, 97. As a result, the system is simplified as the valves can be automatically regulated in opening/closing by regulating the rotational speed of the cell 3.

Another mode of the invention will now be described in relation to FIGS. 11 to 14.

The device has a module 124 into which a capsule can be inserted.

The capsule contains a food substance for being brewed and the capsule is removed from the module after use for being discarded (e.g., for waste or recycling of the organic and inorganic raw materials). The module 124 is in fluid communication with a water supply such as a water reservoir 125. A fluid transport means such as a pressure pump 126, e.g., a centrifugal pump, is provided in the fluid circuit 127 between the module and the water supply. A water heater 128 is further provided to heat water in the fluid circuit before water enters the module. The water heater can be inserted in the fluid circuit to heat fresh water coming from the reservoir or alternatively can be in the water reservoir that becomes a water boiler in such case. Of course, water can also be taken directly from a domestic water supply via a water plug connection.

Water can be fed in the module 124 at low pressure or even at gravity pressure. For example, a pressure preferably less than 2.5 bar, e.g., of between 0 and 2.0 bar above atmospheric pressure, can be envisaged at the water inlet of the module.

The brewing module 124 can comprise two main capsule encasing sub-assemblies 129, 130; mainly comprising a water injection sub-assembly and a liquid receiving subassembly. The two subassemblies form positioning and centring means for centrifuging the capsule along an axis of rotation I in the device.

Figure 12:
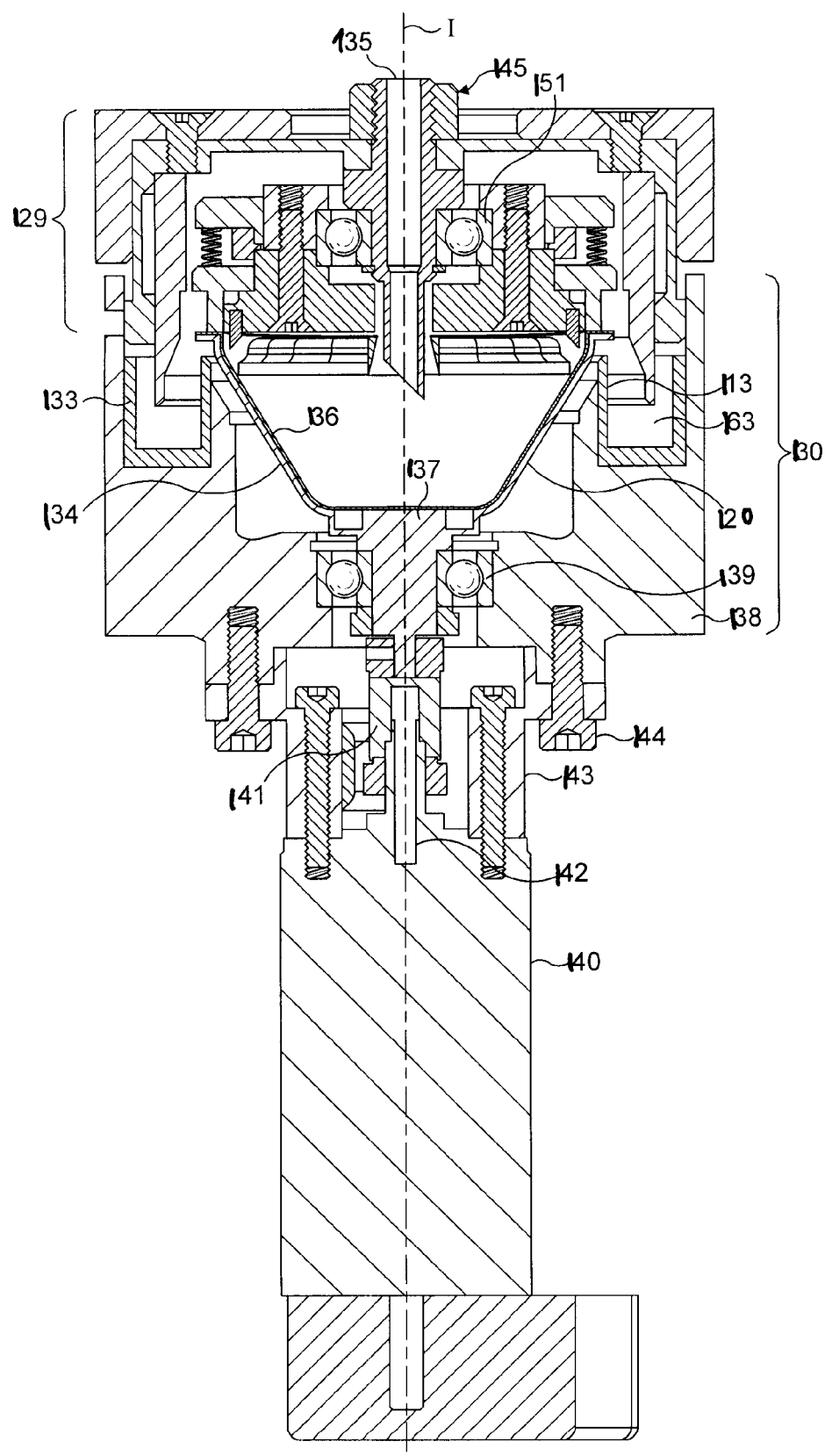
FIG. 12 shows a cross section view along A-A of the view of FIG. 11.

The two assemblies' closes together to encase the capsule therein for example by a bayonet-type connection system 131. The liquid receiving subassembly 130 comprises a liquid duct 132, for example, protruding on a side of the subassembly for guiding the centrifuged liquid coming out of the capsule to a service receptacle such as a cup or glass. The liquid duct is in communication with a liquid receiver 133 forming a cylindrical wall placed at a short distance about a rotating drum 134 into which the capsule 120 is inserted as illustrated in FIG. 12. The liquid receiver defines an intermediate cavity 163 for collecting the liquid as will be explained later in the description. Below the liquid receiving subassembly 130, are placed means for driving the capsule receiving drum 134 in rotation inside the subassembly.

The driving means comprise preferably a rotary motor 140 which can be supplied by electricity or gas power.

The water injection subassembly comprises a water inlet side comprising a water inlet 135 in fluid communication upstream with the water fluid circuit 127.

Figure 13:
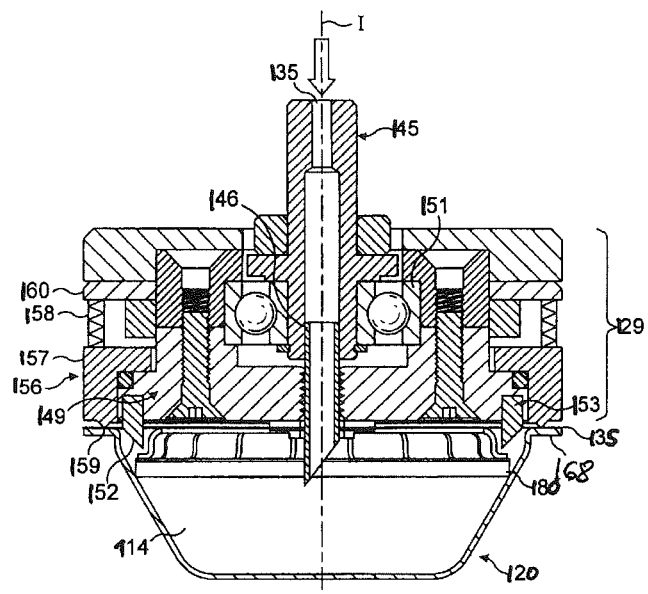
FIG. 13 shows according to a preferred embodiment, a detail and partial view of the view of FIG. 12, in particular, the configuration of the receptacle and the injection subassembly.
Figure 14:
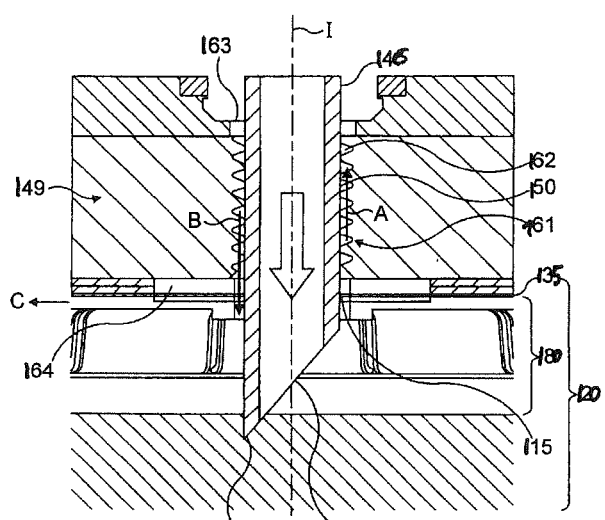
FIG. 14 is shows an enlarged detail of the view of FIG. 13, in particular, the dynamic seal means.

In relation to FIG. 12, the rotary drum 134 is shaped as a hollow capsule holder with an internal cavity 136 complementary shaped to receive the capsule. The rotary drum 134 prolongs itself axially by a rotating shaft 137 which is maintained in rotational relationship relative to an outer base 138 of the liquid receiver 133 by a rotational guiding means 139 like a ball bearing or needle bearing. Therefore, the rotary drum is designed to rotate around a median axis I whereas the outer base 138 of the receiver is fixed relative to the device. The liquid receiver 133 can be fixed to a housing 143 of the motor 140 by bolts 144 for example. A mechanical coupling 141 is placed at the interface between the rotating shaft 137 of the drum and the shaft 142 of the motor 140. Considering the water injection subassembly 129, as illustrated in FIGS. 13 and 14, it comprises a centrally arranged water injector 145 which is fixed in the device relative to the longitudinal axis I of the device. The water injector comprises a central tubular member 146 for transporting water from the inlet area 135 to a water outlet 147 that is intended to protrude inside the enclosure 114 of the capsule 120. The water outlet 147 is formed of a puncturing means 148 such as a sharp tubular tip that is able to create a puncture hole 115 through a closing foil 135 of the capsule and through an eventual breakable part of an internal element 180 comprising openings or slots for filtering the substance in the enclosure.

About the water injector is mounted in rotational relationship a capsule rotary engaging base 149. The rotary engaging base 149 has a central bore 150 for receiving the water injector 145, in particular the piercing tubular member 146, and rotational guiding means such as a ball or needle bearing 151 inserted between the base 149 and the injector 145.

The engaging base further comprises outlet piercing members 152, 153 protruding from the disc-shaped engaging base 149. The piercing members 152, 153 can be small cylindrical portions with a slanted cutting surface able to cut or perforate small holes in the sealing foil 135 of the capsule.

The piercing members are arranged at the periphery of the surface of the engaging base, preferably evenly distributed to provide several openings in the capsule for the centrifuged liquid to leave the capsule forming several streams of liquid. The piercing members provide a connection between the base 149 and the capsule enabling to drive the capsule in rotation together with the base. According to one aspect of the invention, the water injection subassembly 129 further comprises a valve system 156 for controlling the flow of liquid that is discharged from the device. The valve system 156 can be arranged around the capsule rotary engaging base 149 in the form of an annular engaging portion 157 which is biased under the force of elastic loading means 158 such as compressive springs. The annular engaging portion 157 includes a pressing peripheral surface 159 which applies a closing force onto the peripheral rim 168 of the capsule to be able to restrict the flow of liquid under the force of the elastic loading means. The engaging portion 157 is spring biased on the rim of the capsule by the elastic loading means 158 inserted in a space between the annular engaging portion 157 and a portion 160 attached to the engaging base. Therefore, at a rest position, the engaging portion 157 of the valve system keeps closing on the rim of the capsule under the compressive effect of the elastic loading means 158.

According to an aspect of the invention, a dynamic seal means 161 is provided at the interface between the water injector 145 and the capsule engaging base 149. The dynamic sealing means can take the form of a free interstice 162 between the piercing tubular member 148 and the bore 150 of the base. Preferably, the interstice is a threading which is marked in the bore itself.

The dynamic sealing means is thus designed to provide venting for the gas that is contained in the capsule. When the capsule is pierced by the water injector, the gas can escape through the interstice, e.g., threading, which is large enough to provide passage to the gas molecules. Gas contained in the capsule can be gas originally contained in the substance itself such as carbon dioxide for coffee and/or inert gas such as nitrogen flushed in the receptacle before closing. As water starts filling the capsule, gas is pushed through the pierced water inlet and beverage outlets of the capsule. Since the valve means 156 closes the passage to the collecting cavity 163 under a certain threshold pressure, gas is not allowed to escape through the valve means 156. Therefore, gas tends to escape through the inlet 115 pierced in the foil of the capsule and then in direction A through the interstice 162.

When the engaging base 149 is driven in rotation with the capsule 120 during the centrifugation operation, the threading 162 of the bore is arranged to turn helicoidally thereby pushing the liquid back to the capsule in the direction B. The momentum created by the rotation of the rotary engaging base on the liquid in the threaded interstice exceeds the momentum provided to the liquid by the pump thereby causing the liquid to stay below the exit level 163 at the upper part of the rotary engaging base 149. Therefore, the sealing means can be defined as "dynamic" because its efficiency on sealing liquid depends on the rotational momentum created by the device.

An additional sealing means 164 can be provided between the surface of the capsule, i.e., the closing foil 135 and the rotary engaging base. The sealing means 164 can be connected to the surface of the base by any suitable connection means such as an adhesive or otherwise. This sealing means is preferably a sealing means which applies an axial sealing force onto the surface of the capsule which prevents liquid from flowing on the surface of the capsule in the centrifugal direction C. Therefore, this sealing means also prevents a bypass of water or liquid via the outer surface of the capsule in direction of the collecting cavity 163 of the device. Preferably, the contact sealing means is placed as close as possible to the water injector to reduce contact between the liquid and the outer surfaces of the capsule. The contact sealing means can be a piece of rubber elastic material such as rubber or silicone O-ring.

What is claimed is:

1. In a method for preparing a liquid comestible from a cell by passing liquid through a liquid comestible forming substance in the cell using centrifugal forces provided by rotating the cell about a central axis, the improvement which comprises controllably purging gas from the cell through at least one gas purge conduit as liquid fills the cell, wherein gas purging ends by closing the at least one gas purge conduit by a valve.

2. The method according to claim 1, wherein the centrifugal forces are applied to rotate the cell at a rotational speed, and which further comprises increasing the rotational speed of the cell after liquid has filled the cell.

3. The method according to claim 2, wherein the gas purge conduit is closed or the rotational speed is increased after a predetermined volume of liquid is filled in the cell or after a predetermined period of time has elapsed.

4. The method according to claim 2, wherein the gas purge conduit is closed or the rotational speed is increased after a level of liquid is detected on the top or outside of the cell.

5. The method according to claim 1, wherein the gas purge conduit is closed automatically by effect of the centrifugal forces acting on the closure of the valve.

6. In a method for preparing a liquid comestible from a cell by passing liquid from a liquid injection conduit through a liquid comestible forming substance in the cell using centrifugal forces provided by rotating the cell about a central axis, the improvement which comprises controllably purging gas from the cell through one or more controlled gas purging conduit(s) as liquid fills the cell, with the gas purging conduit(s) substantially concentrically arranged around the liquid injection conduit and the central axis of rotation of the cell, with the gas purging conduit(s) allowing the gas to move away from the cell in a direction opposite to the direction of injection of liquid into the cell.

7. The method according to claim 6, which further comprises prewetting the substance in the cell by filling liquid in the cell and rotating the cell at a first rotational speed; and then extracting the liquid comestible from the cell in an extraction phase which comprises continuing to fill liquid into the cell and rotating the cell at a second rotational speed that is higher than the first rotational speed.

8. The method according to claim 7, wherein a series of gas purging conduits are present, arranged concentrically about the injection conduit, with the conduits associated with sealing elements that are initially relaxed to close the conduits but that deform at the second rotational speed to allow gas to be purged through the conduits.

9. The method according to claim 6, wherein a single cylindrical gas purging conduit is present and surrounds the injection conduit, the gas purging conduit having a free end or inlet of that is operatively associated with a particle filter in the form of a grid, mesh or sintered block, or with the particle filter in the form of a series of slots in an upper portion of the cell subjacent the free end or inlet of the cylindrical gas purging conduit.

10. In a method for preparing a liquid comestible from a cell by passing liquid from a first liquid injection conduit through a liquid comestible forming substance in the cell using centrifugal forces provided by rotating the cell about a central axis, the improvement which comprises controllably purging gas from the cell through at least one gas purging conduit as liquid fills the cell, wherein the at least one gas purging conduit is other than the first liquid injection conduit.

11. The method according to claim 10, wherein gas is purged through a gas purging conduit concentrically arranged around the first liquid injecting conduit.

12. The method according to claim 10, wherein the centrifuged liquid is prevented from being discharged from the cell by a discharge valve until a sufficient centrifugal speed is reached.

13. In a method for preparing a liquid comestible from a cell by passing liquid through a liquid comestible forming substance in the cell using centrifugal forces, the improvement which comprises controllably purging gas from the cell as liquid fills the cell, wherein the method is conducted in a beverage production system comprising:
   liquid injection means for passing the liquid into the cell by injection,
   rotational driving means for driving the cell in rotation at least one centrifugal speed to apply the centrifugal forces to the cell,
   peripheral discharge means for enabling the liquid comestible to leave the cell while the cell is rotating at the centrifugal speed,
   gas purging means configured to controllably purge gas from the cell as the liquid fills the cell, and
   means for detecting the filling level of liquid in the cell.

14. The method according to claim 13, wherein the purging means comprises at least one gas dedicated purging conduit.

15. The method according to claim 14, wherein the gas is controllably purged by providing a valve for controlling the opening and closing of the gas purging conduit.

16. The method according to claim 13, which further comprises providing speed control means for increasing the rotational speed of the driving means to vary the beverage preparation cycle from a prewetting phase to an extraction phase.

17. In a method for preparing a liquid comestible from a cell by passing liquid through a liquid comestible forming substance in the cell using centrifugal forces, the improvement which comprises controllably purging gas from the cell as liquid fills the cell, wherein the method is conducted in a beverage production system comprising:
   liquid injection means for passing the liquid into the cell by injection,
   rotational driving means for driving the cell in rotation at least one centrifugal speed to apply the centrifugal forces to the cell,
   peripheral discharge means for enabling the liquid comestible to leave the cell while the cell is rotating at the centrifugal speed, and
   gas purging means configured to controllably purge gas from the cell as the liquid fills the cell, wherein the gas purging means comprises fluid selective sealing means that include a free interstice between the liquid injecting means and a bore of a rotary engaging base engaging on the cell.

18. The method according to claim 17, wherein the free interstice is obtained by helicoidal threading.

19. The method according to claim 17, wherein the cell comprises a cup-shaped body that contains therein a liquid comestible forming substance; and a filter for preventing solids from being carried by gas during the gas purge.

20. The method according to claim 19, wherein the filter is placed in a central portion of an internal lid inserted in the cup-shaped body of the capsule.

* * * * *